United States Patent
Yu Chen (10) Patent No.: US 9,126,612 B2
(45) Date of Patent: Sep. 8, 2015

(54) CABLE REEL TROLLEY

(71) Applicant: Hsiu-Man Yu Chen, Taichung (TW)

(72) Inventor: Hsiu-Man Yu Chen, Taichung (TW)

( * ) Notice: Subject to any disclaimer, the term of this patent is extended or adjusted under 35 U.S.C. 154(b) by 92 days.

(21) Appl. No.: 13/973,151

(22) Filed: Aug. 22, 2013

(65) Prior Publication Data
US 2015/0054240 A1    Feb. 26, 2015

(51) Int. Cl.
*B62B 3/10* (2006.01)
*B62B 3/12* (2006.01)
*B66D 1/00* (2006.01)

(52) U.S. Cl.
CPC .... *B62B 3/10* (2013.01); *B62B 3/12* (2013.01)

(58) Field of Classification Search
CPC .. B65H 75/403; B65H 2701/33; B65H 49/32; B65H 2701/373; B65H 2701/51342; B65H 57/00; B65H 75/4478; B65H 75/4463; B65H 75/4468; B65H 2301/41306; B65H 2701/332; B65H 2701/5136; B65H 2701/51526; B65H 49/305; B65H 49/321; B65H 61/00; B65H 75/22; B65H 75/40; B65H 75/44; B65H 75/4471; B21C 47/34; B21C 47/24; B65B 13/185
USPC .......... 280/47.11, 47.131, 47.16, 47.17, 47.2, 280/79.4
See application file for complete search history.

(56) References Cited

U.S. PATENT DOCUMENTS

| | | | | |
|---|---|---|---|---|
| 2,155,769 A | * | 4/1939 | Porter | 242/598.3 |
| 2,155,771 A | * | 4/1939 | Porter | 242/128 |
| D164,546 S | * | 9/1951 | Becker | D8/359 |
| 3,224,705 A | * | 12/1965 | Nash | 242/566 |
| 4,006,865 A | * | 2/1977 | Howard | 242/388.7 |
| 4,564,152 A | * | 1/1986 | Herriage | 242/422.4 |
| 4,768,546 A | * | 9/1988 | Brusadin et al. | 137/355.27 |
| 5,275,349 A | * | 1/1994 | Tussing | 242/557 |
| 5,308,011 A | * | 5/1994 | Roman | 242/403.1 |
| 5,308,012 A | * | 5/1994 | Fuller | 242/557 |
| 5,316,232 A | * | 5/1994 | Lambert, Jr. | 242/422.4 |
| 5,462,298 A | * | 10/1995 | Bodine | 280/47.34 |
| 5,484,160 A | * | 1/1996 | Ek | 280/659 |
| 5,620,193 A | * | 4/1997 | Dschaak | 280/47.31 |
| 5,626,307 A | * | 5/1997 | Smith | 242/403.1 |
| 5,931,484 A | * | 8/1999 | Jones et al. | 280/47.24 |
| 6,457,669 B1 | * | 10/2002 | Chuang | 242/588.2 |
| D547,021 S | * | 7/2007 | Stein | D34/17 |
| D664,026 S | * | 7/2012 | Zalzalah | D8/359 |
| 8,353,307 B2 | * | 1/2013 | Blaszczak et al. | 137/355.27 |
| 8,403,250 B1 | * | 3/2013 | Callahan | 242/403.1 |
| 8,801,005 B1 | * | 8/2014 | Flickner et al. | 280/79.2 |
| 2007/0114503 A1 | * | 5/2007 | Baughman et al. | 254/134.5 |

* cited by examiner

*Primary Examiner* — Brodie Follman
*Assistant Examiner* — Bridget Avery
(74) *Attorney, Agent, or Firm* — Ming Chow; Sinorica, LLC (57) ABSTRACT

A cable reel trolley includes a main body fixed with a carrying unit, and a wheel frame and a third wheel at the bottom, with the third wheel parallel to the wheel frame. The wheel frame has two ends respectively installed with a first wheel and a second wheel. A direction-swaying member is fixed between the wheel frame and the first wheel, able to shift the axial direction of the first wheel so that the trolley can move with the first wheel and the second wheel or with the first wheel and the third wheel optionally. That is, the trolley can travel forward and backward or leftward and rightward, turning vertically in a narrow space.

9 Claims, 7 Drawing Sheets

CABLE REEL TROLLEY

BACKGROUND OF THE INVENTION

1. Field of the Invention

This invention relates to a cable reel trolley.

2. Description of the Prior Art

Commonly, a conventional cable reel trolley is provided with a movable main body having plural wheels so as to release or roll up cable with mobility.

However, the wheels of the cable reel trolley are mostly installed in an exact direction unable to make a turn. As the cable reel trolley can only run forward or backward in a straight line, much manpower is needed to remove it in case of shifting direction, wasting time and manpower. Moreover, the cable reel trolley may be improper to work at a narrow site.

SUMMARY OF THE INVENTION

The object of this invention is to offer a cable reel trolley able to move forward and backward or leftward and rightward, turning vertically in a narrow space.

The main characteristics of the invention are a main body, a carrying unit and a mobile unit. The main body is provided with a positioning frame, a holding portion formed at the middle of the top of the positioning frame, a U-shaped horizontal rod with two parallel portions at the bottom of the positioning frame, and a connecting rod jointed between two ends of the holding portion and the horizontal rod respectively. A grip is extended upward from another side of the horizontal rod. The carrying unit is provided with a rotatable rod pivotally located at a central portion of the main body, plural supporting frames radially extended outward from the circumference of the rotatable rod, and an annular frame fixed with another ends of the supporting frame. The mobile unit is provided with a wheel frame horizontally fixed at the bottom of the main body. A first wheel and a second wheel are pivotally installed with two ends of the wheel frame respectively. A direction-swaying member is installed between the wheel frame and the first wheel to enable the first wheel to shift direction. A third wheel is pivotally fixed at another side of the bottom of the main body, parallel to the wheel frame.

With the direction-swaying member to shift axial directions of the first wheel, the trolley can move forward and backward with the first wheel and the second wheel or leftward and rightward with the first wheel and the third wheel optionally. So the trolley can turn vertically even in a narrow space.

BRIEF DESCRIPTION OF DRAWINGS

This invention is better understood by referring to the accompanying drawings, wherein.

DETAILED DESCRIPTION OF THE PREFERRED EMBODIMENT

Figure 1:
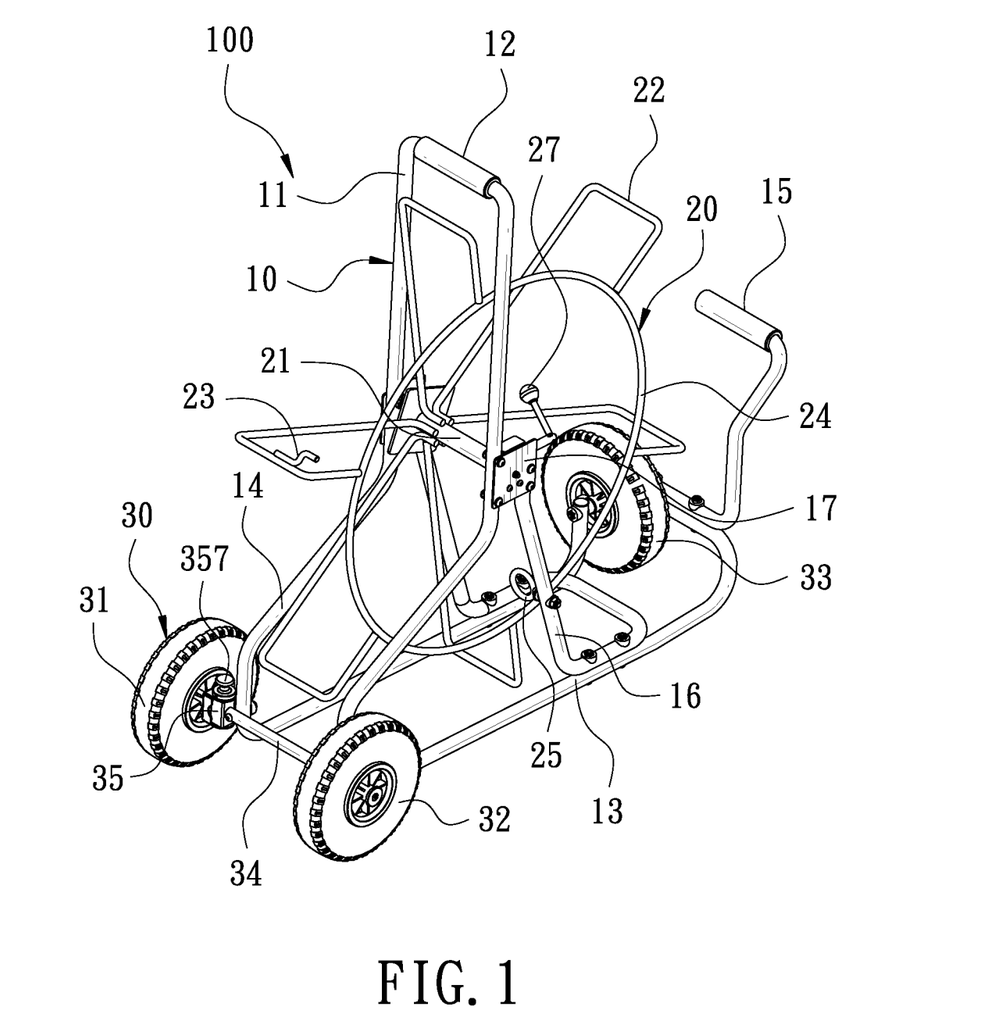
FIG. 1 is a perspective view of a cable reel trolley in the present invention.

As shown in FIG. 1, a preferred embodiment of cable reel trolley 100 in the present invention includes a main body 10, a carrying unit 20 and a mobile unit 30.

The main body 10 is provided with a positioning frame 11, a holding portion 12 formed U-shaped at the middle of the top of the positioning frame 11, a U-shaped horizontal rod 13 with two parallel portions at the bottom of the positioning frame 11, and a connecting rod 14 jointed between two ends of the holding portion 12 and the horizontal rods 13 respectively. Extended upward from another side of the horizontal rod 13 is a grip 15. Further, the main body 10 is also provided with a supporting frame 16 connected with the positioning frame 11 and the horizontal rod 13, and two fixing plates 17 used to make the positioning frame 11 and the supporting frame 16 fixedly combined together.

Figure 2:
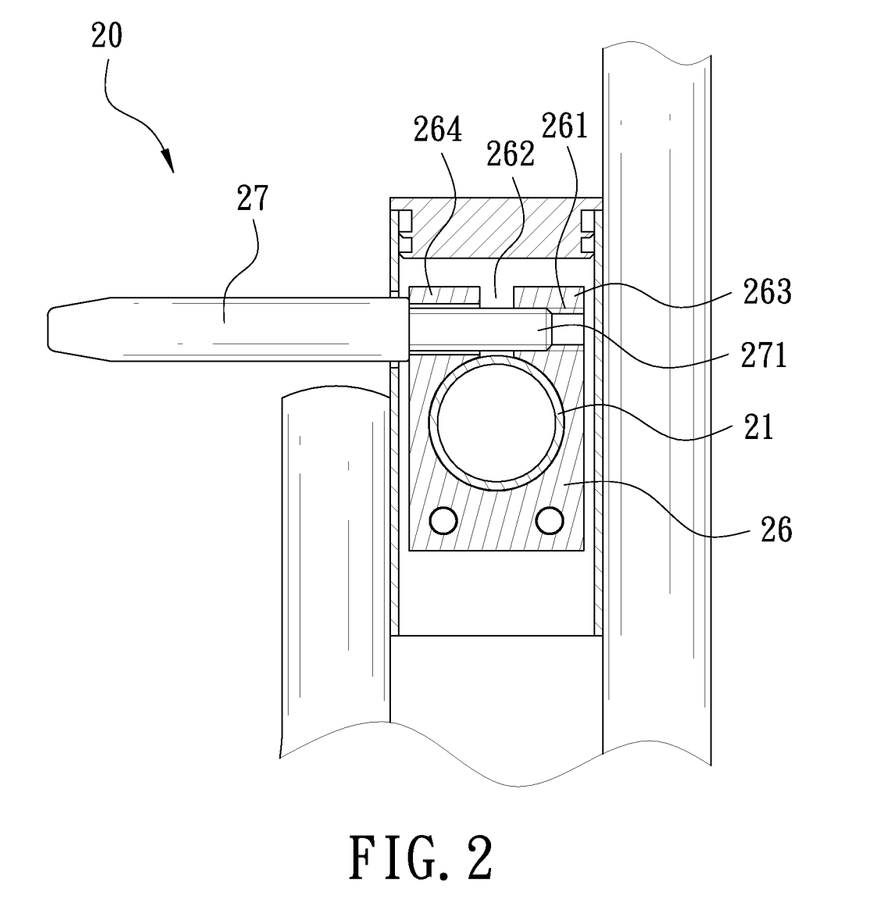
FIG. 2 is a cross-sectional view of a packing of the cable reel trolley in the present invention.

The carrying unit 20 is provided with a rotatable rod 21 pivotally located at a central portion of the main body 10 and pivotally fixed with the fixing plates 17, and plural supporting frames 22 radially extended outward from the circumference of the rotatable rod 21. One of the supporting frames 22 is fixed with a hook 23 for fastening a free end of a cable. An annular frame 24 is fixed with another end of the supporting frames 22, provided with a leading ring 25 for cable to travel through. As shown in FIG. 2, a packing 26 is mounted on each end of the rotatable rod 21 to correspond to the fixing plates 17, connected with a working rod 27 able to be operated to tighten the rotatable rod 21 to restrict the carrying unit 20 from rotating. In this embodiment, the packing 26 is provided with an opening 262, shaped as a C with two free ends 263 and 264. A threaded hole 261 is bored in the packing 26 at the free end 263 to engage with a threaded section 271 of the working rod 27. The working rod 27 is inserted in the free ends 263 and 264, with the threaded section 271 deeply engaged with the threaded hole 261 to make the packing 26 tightened up. Relatively, the rotatable rod 21 can be squeezed as well to restricting the carrying unit 20 from whirling.

Figure 3:
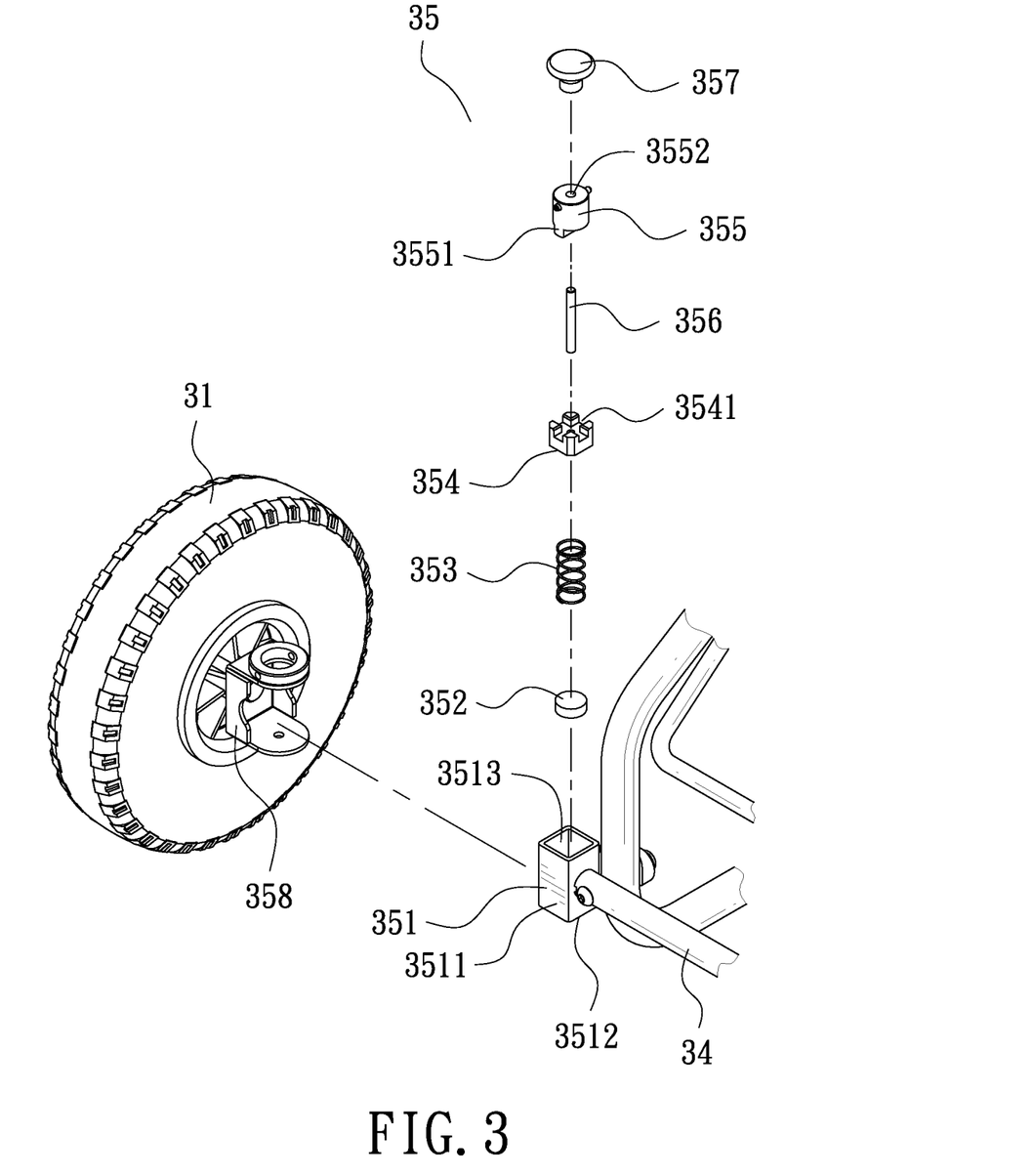
FIG. 3 is a partial exploded perspective view of a packing of the cable reel trolley in the present invention.

The mobile unit 30 is provided with a wheel frame 34 horizontally fixed at the bottom of the main body 10 between the connecting rods 14, a first wheel 31 and a second wheel 32 pivotally installed at two ends of the wheel frame 34 respectively, and a direction-swaying member 35 installed between the wheel frame 34 and the first wheel 31 to enable the first wheel 31 to shift its direction. Further, a third wheel 33 is pivotally fixed at another side of the bottom of the main body 10, parallel to the wheel frame 34. And, as shown in FIG. 3, the direction-swaying member 35 is provided with a positioning sleeve 351 fixed with the wheel frame 34, and a swaying base 358. The positioning sleeve 351 is further provided with a circumferential wall 3511, a bottom wall 3512 and an accommodating space 3513 encompassed by the circumferential wall 3511 and the bottom wall 3512. The direction-swaying member 35 is further provided with a sustaining block 352 fixed on the bottom wall 3512, a spring 353 pressing on the sustaining block 352 with one end, and a restricting block 354 laid on another end of the spring 353 and having two restricting grooves 3541 crossed with each other. A positioning block 355 is correspondingly laid on the restricting block 354, provided with a positioning rib 3551 corresponding to the restricting grooves 3541, and a through hole 3552 bored axially in the center for being inserted by a leaning rod 356. An operating button 357 is connected with one end of the leaning rod 356, and the restricting block 354 is pressed by another end of the leaning rod 356. The swaying base 358 has one end engaged with a circumference of the positioning block 355 and another end pivotally connected with the positioning sleeve 351. The first wheel 31 is pivotally connected with the swaying base 358.

Figure 4:
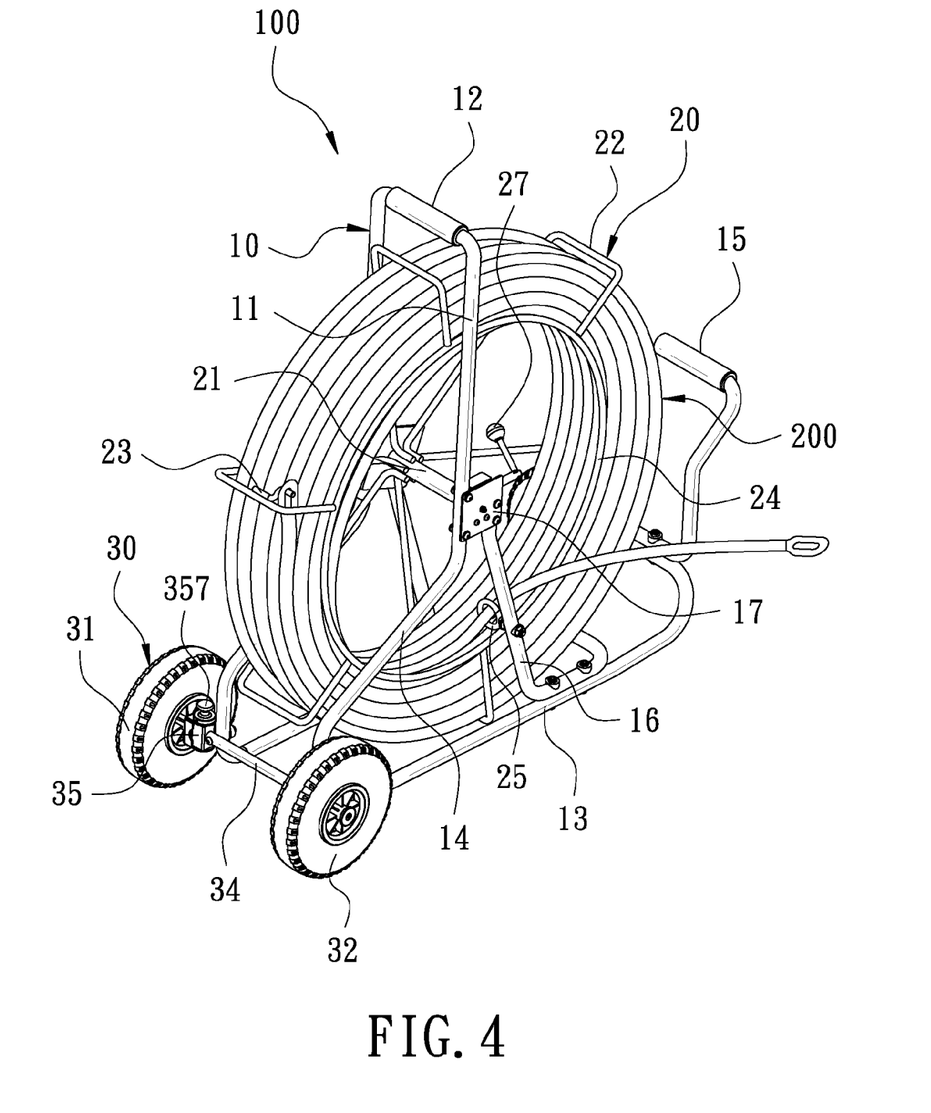
FIG. 4 is a perspective view of the cable reel trolley in the present invention, showing it being operated.

With reference to FIGS. 2 and 4, when a cable 200 is to be wound into the carrying unit 20, a free end of the cable 200 has first to be inserted through the leading ring 25 and fastened on the hook 23. Next, the working rod 27 is operated to make the packing 26 loosening from the rotatable rod 21 so that the carrying unit 20 can start whirling to wind up the cable 200 through the inner side of the annular frame 24 to rest at the inner side of the supporting frames 22. After winding the cable 200 is finished, the working rod 27 is again operated to force the packing 26 to tighten the rotatable rod 21 preventing the carrying unit 20 from rotating, with the cable 200 steadily confined in the carrying unit 20. On the contrary, if the cable 200 is to be released from the carrying unit 20, the working rod 27 has to be operated to make the packing 26 loosen from the rotatable rod 21 to enable the carrying unit 20 to freely rotate. Then the cable 200 can be smoothly pulled out of the carrying unit 20 through the inner side of the annular frame 24 for being used on site.

Figure 5:
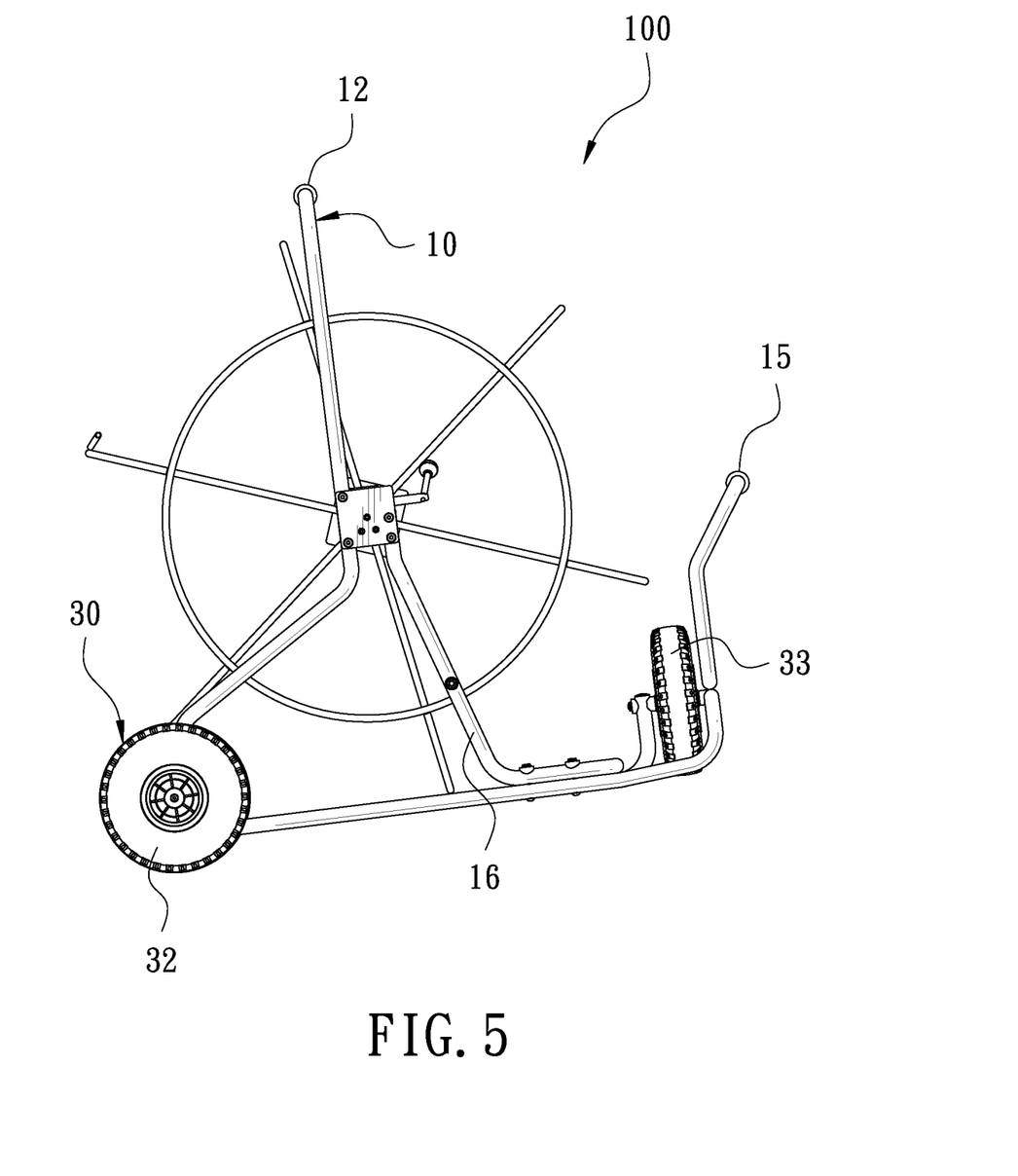
FIG. 5 is a side view of the cable reel trolley in the present invention, showing it being operated in a first situation.

As shown in FIGS. 1 and 5, when the cable reel trolley 100 is to be moved, a user just needs to hold the grip 15 and slightly lift up the cable reel trolley 10 with an oblique angle. Then the first wheel 31 and the second wheel 32 can move exactly forward and backward even in a narrow space.

Figure 6:
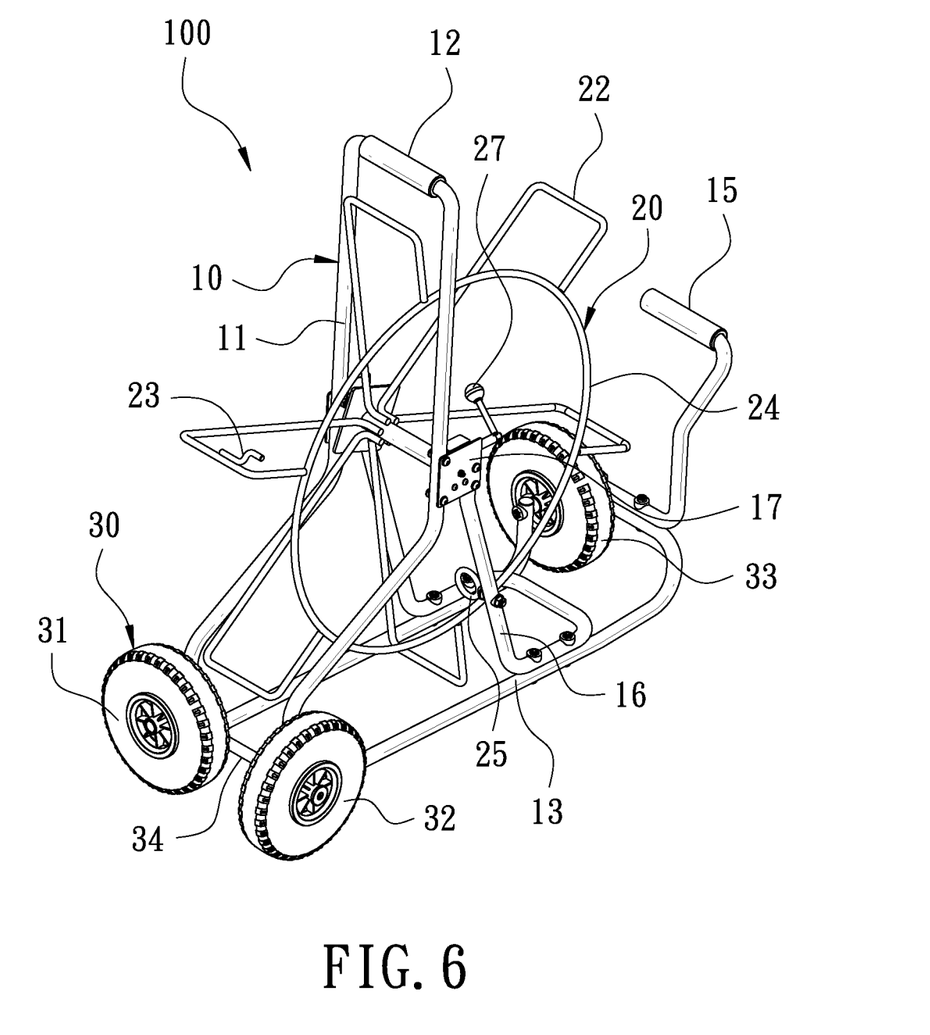
FIG. 6 is a perspective view of the cable reel trolley in the present invention, showing it being shifted into a second situation.

As shown in FIGS. 1, 3, and 6, when the cable reel trolley 100 is to turn with a right angle or to vertically change a direction on the spot, a user just needs to press the operating button 357 to consecutively push the leaning rod 356 and the restricting block 354 to compress downward the spring 353, with the positioning block 355 freed from being restricted by the restricting block 354 able to freely rotate. So the swaying base 358 can drive the first wheel 31 to whirl for changing the axial direction to enable the first wheel 31 heading to a direction expected to move. By the time, the axial direction of the first wheel 31 is altered from being parallel (a first situation) to vertical (a second situation) to that of the second wheel 32

By the time, the axial direction of the first wheel 31 is altered from the first situation (parallel to that of the second wheel 32) to the second situation (vertical to that of the second wheel 32). As the first wheel 31 stays at the second situation, the user can release the operating button 357 so that the spring 353 can elastically restore to push up the restricting block 354 and the positioning block 355, with the positioning rib 3551 restrictively fitted in the restricting groove 3541 to restrict the positioning block 355 from driving the swaying base 358 and the first wheel 31 to swing. By the time, the first wheel 31 is stably swayed to axially parallel to the third wheel 33, heading to a direction expected to be changed.

Figure 7:
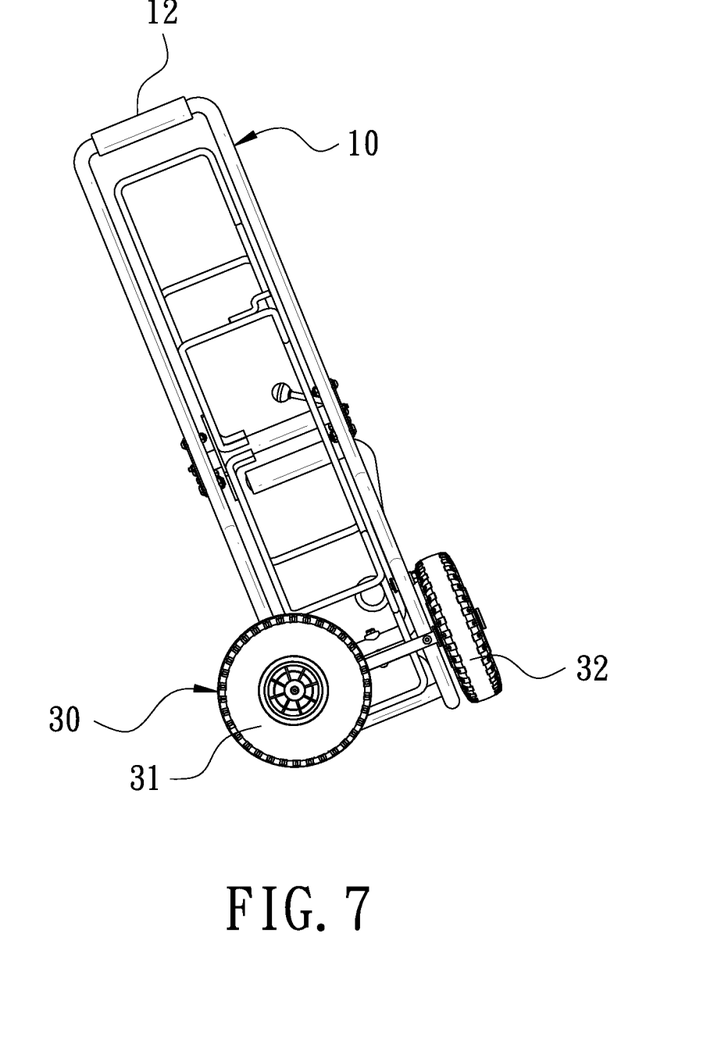
FIG. 7 is a side view of the cable reel trolley in the present invention, showing it being operated in the second situation.

With reference to FIGS. 6 and 7, as the first wheel 31 is altered to be parallel to the third wheel 33 as defined by the second situation, a user can grip the holding portion 12 and slightly tilt the cable reel trolley 100 to enable it to move leftward or rightward by means of the first wheel 31 and the third wheel 33.

With the first wheel 31 collaborating with the second wheel 32, the cable reel trolley 100 can move forward or backward, and with the first wheel 31 collaborating with the third wheel 33, the cable reel trolley 100 can move sideward in a direction vertical to the original direction. So the cable reel trolley 100 can vertically change moving direction, proper for working in a narrow space.

It should be noted that, with the wheel 31 standing vertically with the wheel 33 or the wheel 32 as holding up with each other, the mobile unit 30 can stay steadily like being braked while not working.

While the preferred embodiment of the invention has been described above, it will be recognized and understood that various modifications may be made therein and the appended claims are intended to cover all such modifications that may fall within the spirit and scope of the invention.

What is claimed is:

1. A cable reel trolley comprising:
a main body provided with a positioning frame possessing a holding portion at a middle of a top;
a U-shaped horizontal rod with two parallel portions at a bottom of said positioning frame;
said horizontal rod comprises a first side and a second side;
a connecting rod jointed between two ends of said holding portion and said first side of said horizontal rods respectively;
a grip extended upward from said second side of said horizontal rod;
a carrying unit provided with a rotatable rod pivotally located at a central portion of said main body and plural supporting frames radially extended outward from a circumference of said rotatable rod with free ends fixed with an annular frame;
a mobile unit provided with a wheel frame horizontally fixed at a bottom of said main body;
a first wheel and a second wheel pivotally installed at two ends of said wheel frame respectively;
a direction-swaying member installed between said wheel frame and said first wheel to enable said first wheel to shift directions;
a third wheel pivotally fixed at another side of a bottom of said main body parallel to said wheel frame;
said direction-swaying member is further provided with a positioning sleeve and a swaying base;
said positioning sleeve accommodating a spring, a restricting block cut with two restricting grooves on a top;
said restricting block laid atop said spring;
a positioning block correspondingly laid on said restricting block and provided with a positioning rib corresponding to said restricting grooves and a through hole bored axially in a center for being inserted by a leaning rod;
said leaning rod having one end connected with an operating button and another end resting on said restricting block; and
said swaying base pivotally connected with said positioning sleeve and said first wheel.

2. The cable reel trolley as claimed in claim 1, wherein said main body is further provided with a supporting frame connected with said positioning frame and said horizontal rod.

3. The cable reel trolley as claimed in claim 1, wherein one of said supporting frames of said carrying unit is fixed with a hook for fastening a free end of a cable.

4. The cable reel trolley as claimed in claim 1, wherein said annular frame is provided with a leading ring for a cable to pass through.

5. The cable reel trolley as claimed in claim 1, wherein said main body is further provided with two fixing plates connected with said positioning frame and said supporting frame of said main body, a packing mounted on each end of said rotatable rod to correspond to said fixing plates and connected with a working rod able to be operated to tighten said rotatable rod to restrict said carrying unit from rotating.

6. The cable reel trolley as claimed in claim 1, wherein said wheel frame is installed between said connecting rods of said main body.

7. The cable reel trolley as claimed in claim 1, wherein said holding portion of said main body is formed U-shaped at a middle of a top of said positioning frame.

8. The cable reel trolley as claimed in claim 2, wherein said main body is further provided with two fixing plates used to make said positioning frame and said supporting frame fixedly combined together, said rotatable rod pivotally connected with said positioning frame.

9. The cable reel trolley as claimed in claim 5, wherein said packing is provided with an opening formed with two free ends, a threaded hole bored in said packing at one of said free ends, said working rod provided with a threaded section to engage with said threaded hole and plugged through said free ends to tighten said packing.

* * * * *